United States Patent
Weise

(10) Patent No.: US 11,675,685 B2
(45) Date of Patent: Jun. 13, 2023

(54) PREVENTIVE CONTROLLER SWITCHOVER

(71) Applicant: ABB Schweiz AG, Baden (CH)

(72) Inventor: Wilhelm Weise, Minden (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/545,131

(22) Filed: Dec. 8, 2021

(65) Prior Publication Data
US 2022/0237100 A1  Jul. 28, 2022

(30) Foreign Application Priority Data
Dec. 9, 2020  (EP) .................................... 20212782

(51) Int. Cl.
*G06F 11/00* (2006.01)
*G06F 11/34* (2006.01)
(Continued)

(52) U.S. Cl.
CPC ...... *G06F 11/3452* (2013.01); *G06F 11/2025* (2013.01); *G06F 11/2028* (2013.01); *G06F 11/3055* (2013.01); *G06F 2201/86* (2013.01)

(58) Field of Classification Search
CPC ............. G06F 11/0706; G06F 11/0709; G06F 11/0736; G06F 11/0739; G06F 11/0751;
(Continued)

(56) References Cited

U.S. PATENT DOCUMENTS

| 2001/0008021 A1* | 7/2001 | Ote | G06F 11/2294 |
| | | | 714/31 |
| 2003/0056140 A1* | 3/2003 | Taylor | G06F 11/0709 |
| | | | 714/4.1 |

(Continued)

FOREIGN PATENT DOCUMENTS

| EP | 2813912 A1 * | 12/2014 | ......... G05B 23/0208 |
| EP | 2813912 A1 | 12/2014 | |

OTHER PUBLICATIONS

European Patent Office, Extended European Search Report in European Patent Application No. 20212782.5, 8 pp., (dated May 12, 2021).

*Primary Examiner* — Michael Maskulinski
(74) *Attorney, Agent, or Firm* — Leydig, Voit & Mayer, Ltd.

(57) ABSTRACT

A preventive switchover from a primary controller to a secondary controller even before the primary controller fails system and method includes a server that collects log files comprising operational parameters of the primary controller from the primary controller in real-time. The server determines abnormal patterns or signatures in the operational parameters of the primary controller by comparing the operational parameters with reference patterns or signatures. The reference patterns or signatures are generated by training one or more Artificial Intelligence (AI) based models. After determining the abnormal patterns or signatures, the server predicts events that will lead to switchover from the primary controller to the secondary controller. Thereafter, the server provides a signal to the primary controller to perform preventive switchover to the secondary controller before the primary controller fails.

13 Claims, 5 Drawing Sheets

(51) Int. Cl.
*G06F 11/20* (2006.01)
*G06F 11/30* (2006.01)

(58) Field of Classification Search
CPC .............. G06F 11/079; G06F 11/0793; G06F 11/2028; G06F 11/3055; G06F 11/3447; G06F 11/3452; G06F 11/3466; G06F 11/2025; G05B 23/0283; G05B 23/0289; G05B 19/4028
See application file for complete search history.

(56) References Cited

U.S. PATENT DOCUMENTS

| | | | |
|---|---|---|---|
| 2005/0060398 A1* | 3/2005 | Owhadi | G06F 11/2294 714/E11.173 |
| 2014/0298113 A1 | 10/2014 | Sakurai et al. | |
| 2018/0257663 A1* | 9/2018 | Jiang | G06F 11/0781 |
| 2021/0406140 A1* | 12/2021 | Sethi | H04L 67/1034 |

* cited by examiner

PREVENTIVE CONTROLLER SWITCHOVER

CROSS-REFERENCE TO RELATED APPLICATIONS

Priority is claimed to European Patent Application Ser. No. 20212782.5, filed on Dec. 9, 2020, the entire disclosure of which is hereby incorporated by reference herein.

FIELD OF THE DISCLOSURE

The present disclosure generally relates to controller redundancy in a process/industrial plant. More specifically, the present invention relates to predicting primary controller failure events and performing switchover to secondary controller.

BACKGROUND OF THE DISCLOSURE

Process or industrial plants comprise a plurality of equipment such as pumps, drives, air compressors, machinery, electrical appliances, etc. It is essential to operate the industrial equipment continuously to ensure maximum output of the process or industrial plant. Current technology enables continuous operation of the equipment to reduce downtime of the equipment operation. Generally, the equipment is controlled by controllers, and due to fault in controllers, the equipment operation is halted. Typically, a redundant controller is configured as a hot stand-by which takes over the control of the equipment when a primary controller fails. The redundant controller may store all the configuration settings and parameters related to operating the equipment when switched from the primary controller. Hence, the redundant controller helps in smooth operation of the process or industrial plant.

In existing controller redundancy systems, the controller switchover occurs after the primary controller has failed. However, the cause of the primary controller failing may also occur in the redundant controller, thus failing the redundant controller. Also, the switchover occurs at a critical time when the primary controller has actually failed. Often times, the primary controller is required to transfer status and operating parameters of the primary controller to the redundant controller. However, when the primary controller has failed, the primary controller cannot transfer all the required data to the redundant controller to efficiently control the equipment. Also, delay in switching from primary controller to redundant controller during the critical time may add to operational failure.

Hence, there is a need to provide a preventive switchover from a primary controller to the redundant controller before the primary controller fails.

BRIEF SUMMARY OF THE DISCLOSURE

In an embodiment, the present disclosure relates to a method, server and a system for performing redundancy switchover in a process/industrial plant. In an embodiment, the process/industrial plant comprises a primary controller and a secondary controller. The primary controller is configured to operate one or more equipment. The secondary controller is redundant to the primary controller. The primary and the secondary controllers are connected to a server. The server is configured to receive log files from the primary controller in real-time, where the log files comprise operational parameters of the primary controller. Further, the server determines abnormal parameters or signatures in the operational parameters of the primary controller by comparing the operational parameters with reference patterns or signatures. In an embodiment, the reference patterns or signatures are generated based on one or more trained models. The server further predicts one or more events leading to a switchover from the primary controller to the secondary controller based on the abnormal patterns or signatures in the operational parameters. Thereafter, the server provides a signal to the primary controller to perform switchover the primary controller to the secondary controller based on the predicted one or more events. Therefore, the switchover occurs even before the one or more events takes place, thus enabling preventive controller switchover.

In an embodiment, the operational parameters comprise at least one of, hardware parameters, software parameters, firmware parameters and network parameters.

In an embodiment, the one or more trained models are Artificial Intelligence (AI) based models.

In an embodiment, the server generates the reference patterns or signatures by performing the following steps. The server receives training log files comprising historical operational parameters of the primary controller. Further, the server detects one or more events which led to the switchover from the primary controller to the secondary controller using the historical operational parameters. Further, the server identifies patterns or signatures in the historical parameters in the training log files corresponding to the one or more events. Thereafter, the server classifies normal patterns or signatures and abnormal patterns or signatures based on the identified patterns or signatures, where the classified patterns are stored as reference patterns. In an embodiment, the one or more trained models determines the abnormal patterns or signatures and predicts the one or more events in real-time.

In an embodiment, the predicted one or more events are displayed on a display unit.

Systems of varying scope are described herein. In addition to the aspects and advantages described in this summary, further aspects and advantages will become apparent by reference to the drawings and with reference to the detailed description that follows.

BRIEF DESCRIPTION OF THE SEVERAL VIEWS OF THE DRAWING(S)

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

DETAILED DESCRIPTION OF A PREFERRED EMBODIMENT

Embodiments of the present invention relates to performing preventive switchover from a primary controller to a secondary controller even before the primary controller fails. A server collects log files comprising operational parameters of the primary controller from the primary controller in real-time. Further, the server determines abnormal patterns or signatures in the operational parameters of the primary controller by comparing the operational parameters with reference patterns or signatures. The reference patterns or signatures are generated by training one or more Artificial Intelligence (AI) based models. After determining the abnormal patterns or signatures, the server predicts events that will lead to switchover from the primary controller to the secondary controller. Thereafter, the server provides a signal to the primary controller to perform preventive switchover to the secondary controller before the primary controller fails. Therefore, the abnormality in the operational parameters is notified and precaution is taken when secondary controller takes over such that the abnormalities do not occur in the secondary controller.

Figure 1:
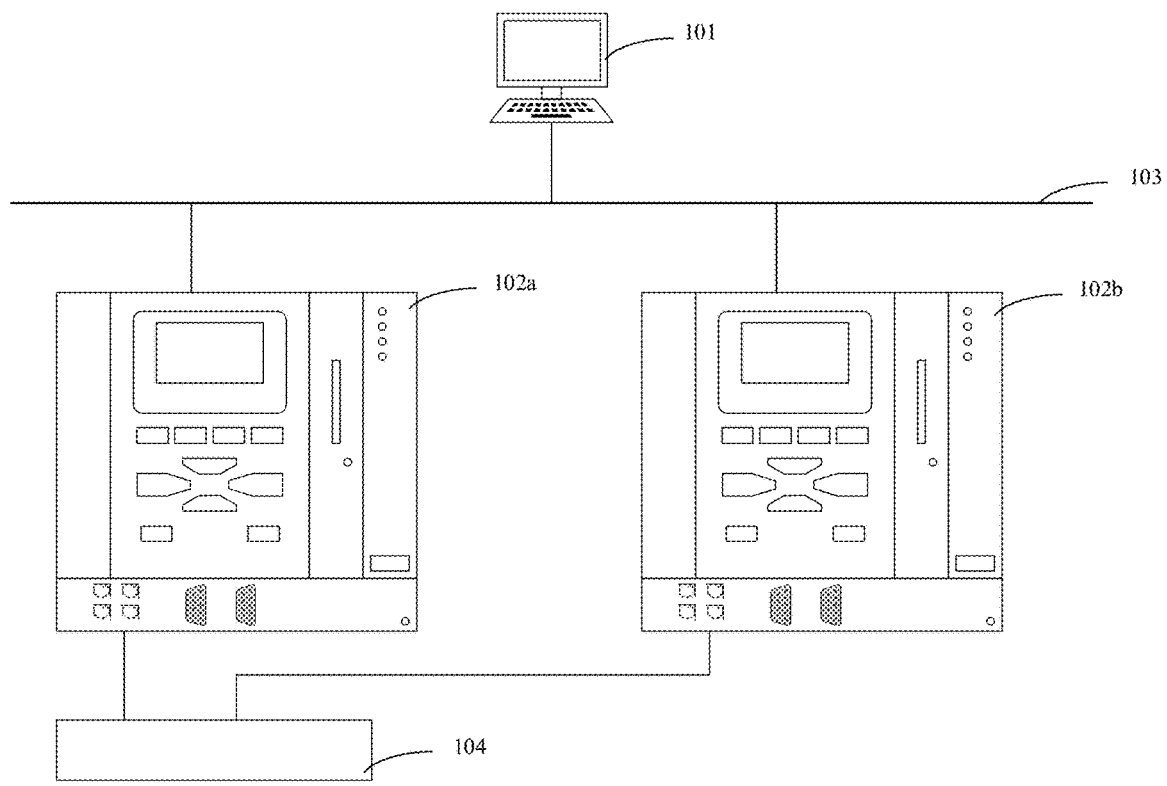
FIG. 1 illustrates controller redundancy in a process/industrial plant, in accordance with some embodiments of the present invention.

FIG. 1 illustrates controller redundancy in a process/industrial plant. The process/industrial plant comprises one or more equipment (104). Examples of equipment includes, but are not limited to, a motor, a drive, a pump, machinery, and the like. The one or more equipment (104) is/are controlled by a primary controller (102a). In an exemplary embodiment, the primary controller (102a) may be connected to the one or more equipment (104) via industry standard communication protocols, examples including but not limited to, Ethernet, RS232, and RS485. Further, the primary controller (102a) may be connected to a server (101) via a network (103). The network (103) may support Ethernet LAN, WAN, Wi-Fi, and the like. In an embodiment, the server (101) may be part of a Distributed Control System (DC S) or a Supervisory Control and Data Acquisition (SCADA) system, or a standalone system. In an embodiment, the server (101) is configured to acquire data of the process/industrial plant and perform analytics on the acquired data. For example, the server (101) may acquire data of the processes, the one or more equipment (104), and the primary controller (102a). In an embodiment, the server (101) may be replaced with a personal computer, a laptop, a mobile, or any other electronic device which is capable of analyzing a plurality of operational parameters of the primary controller (102a) and predicting failure condition in the primary controller (102a).

In an embodiment, a secondary controller (102b) is commissioned as a redundant controller in the process/industrial plant. In order to reduce downtime due to failure of the primary controller (102a), the secondary controller (102b) is used as the redundant controller. In an embodiment, the secondary controller (102b) is connected to the one or more equipment (104) and to the server (101). In an embodiment, the primary controller (102a) and the secondary controller (102b) may be connected via a redundancy link. The redundancy link may support Ethernet protocol. Other protocols known in the art may be used as the redundancy link as well. Conventionally, when the primary controller (102a) fails, the switchover occurs from the primary controller (102a) to the secondary controller (102b). The primary controller (102a) initiates the redundancy switchover to the secondary controller (102b). Generally, the primary controller (102a) transfers the plurality of operational parameters and a status of the one or more equipment to the secondary controller while initiating the redundancy switchover. Therefore, when the secondary controller (102b) takes over, the operation of the process/industrial plant can resume from where the primary controller (102a) had failed. In an embodiment, reasons for failure of the primary controller (102a) can include, but not limited to, hardware faults, software faults, firmware faults, and network faults. In an embodiment, the secondary controller (102b) may be connected to the server (101) via network (103) different from the network used for connecting the primary controller (102a) to the server (101). Therefore, when the primary controller (102a) has failed due to network fault, the secondary controller (102b) is secure from the network fault.

Figure 2:
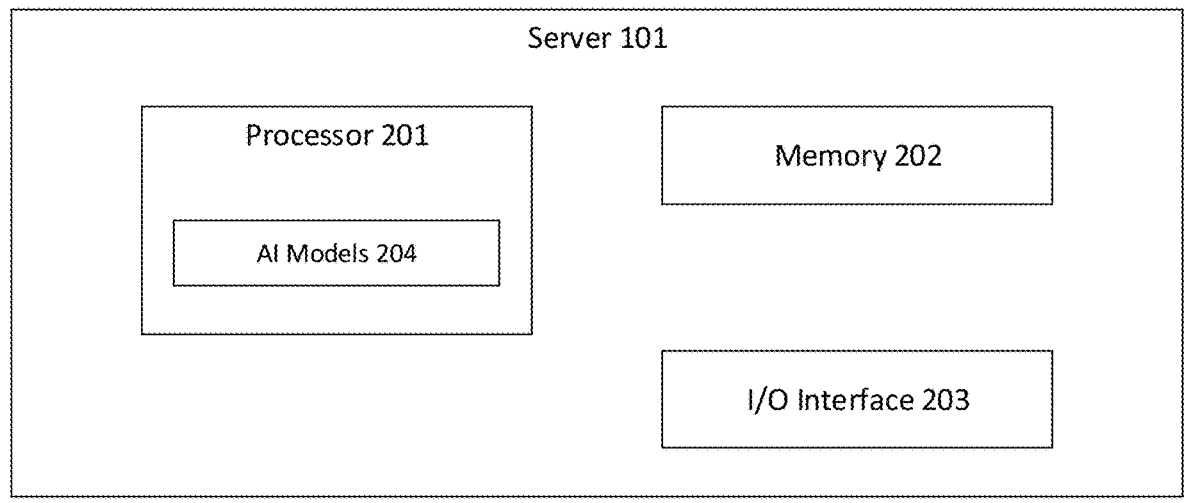
FIG. 2 illustrates internal architecture of a server for performing preventive switchover in a process/industrial plant, in accordance with some embodiments of the present invention.

Reference is now made to FIG. 2. FIG. 2 illustrates internal architecture of the server (101). The server comprises one or more processors (201), a memory (202) and an Input/Output (I/O) interface (203). The I/O interface (203) provisions connection between the server (101), and the primary controller (102a) and the secondary controller (102b). The I/O interface (203) may also provision connection between the server (101) and the DCS or SCADA. In an embodiment, the memory (202) stores the plurality of operational parameters of the primary controller (102a). In an embodiment, the memory (202) may be a database. In an embodiment, the one or more processors (201) is configured to receive the plurality of operational parameters of the primary controller (102a) in real-time. In an embodiment, the one or more processors (201) may receive the operational parameters at regular intervals. In one embodiment, the one or more parameters may be time series data. The one or more processors (201) determines abnormal patterns or signatures in the plurality of operational parameters by comparing the plurality of operational parameters with reference patterns or signatures. The reference patterns or signatures are generated by one or more trained models (AI models (204)). Further, the one or more models (204) predicts one or more events that leads to failure of the primary controller (102a), which eventually leads to switchover from the primary controller (102a) to the secondary controller (102b). Thereafter, the one or more processors (201) provides a signal to the primary controller (102a) to perform a switchover from the primary controller (102a) to the secondary controller (102b) based on the predicted one or more events. Therefore, the switchover is performed even before the primary controller (102a) fails, which leads to a preventive controller switchover. The preventive controller switchover enables smooth switchover. Also, as the predictive controller switchover occurs before the primary controller (102a) fails, the criticality of the switchover is reduced, thus providing more efficient switchover to the secondary controller (102b). The advantages can be realized in view of further embodiments which are explained along with examples.

Figure 3A:
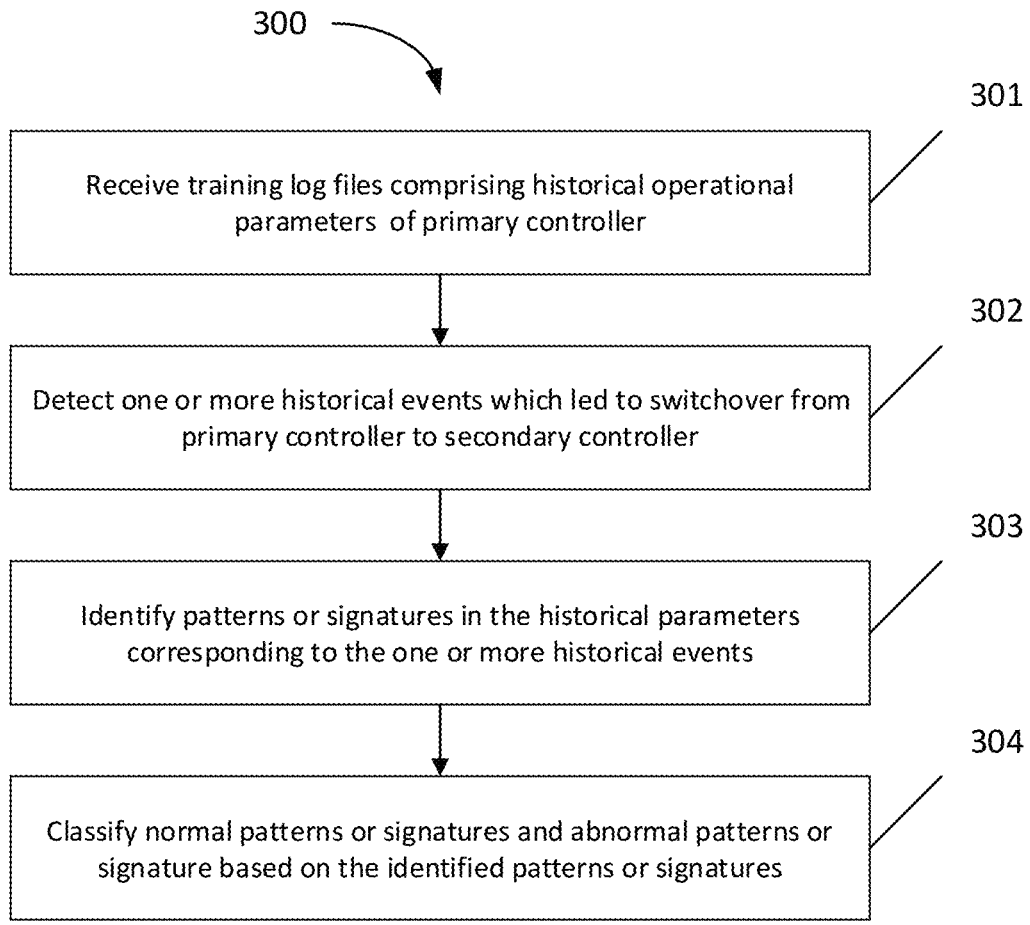
FIG. 3a illustrates training and inference stages of models for generating reference patterns or signatures, in accordance with some embodiments of the present invention.

FIG. 3a illustrates training and inference stages of one or more models (204) for generating reference patterns or signatures. The one or more models (204) is/are implemented in the server (101), and the one or more models (204) is/are trained to generate the reference patterns or signatures.

At step (301) the one or more models (204) receive training log files comprising historical operational parameters of the primary controller (102a). The training log files may be obtained from one or more historians associated with the process/industrial plant. The training logs may be selected which comprises the historical operational parameters which led to the switchover from the primary controller (102a) to the secondary controller (102b).

At step (302) the one or more models (204) detect one or more historical events that led to the switchover from the primary controller (102a) to the secondary controller (102b). In an embodiment, a domain expert may label the historical operational parameters with the one or more historical events. The one or more events are failure events in the primary controller (102a). In an embodiment, the domain expert may label for few historical operational parameters and train the one or more models (204) to label for a large set of historical operational parameters. For example, the domain expert may label a first set of historical operational parameters with the label "memory fault," a second set of historical operational parameters with the label "communication port fault," a third set of historical parameters with the label "null zero fault," a fourth set of historical operational parameters with a label "communication fault." In an embodiment, each type of controller failure (historical events) may be diagnosed and a root cause may be associated. For example, the failure "memory fault" may be associated with a root cause "insufficient memory," the failure "null zero fault" may be associated with a root cause "incorrect dynamic memory allocation," the failure "communication fault" may be associated with a root cause "firmware incompatibility," and the failure "communication port fault" may be associated with the root cause "burnt port." The above examples should not be considered as limitations and other examples commonly known to a person skilled in the art are also envisaged with the instant invention.

At step (303), the one or more models (204) identify patterns or signatures in the historical operational parameters corresponding to the one or more historical events. In an embodiment, the one or more models (204) may include, but not limited to classification models, regression models or any other type of models which are capable of determining patterns or signatures in the historical operational parameters. In some embodiment, the patterns may refer to variations in the historical operational parameters before the one or more historical events occurred in the primary controller (102a). For example, there may be specific pattern in the historical operational parameters when a "memory fault' occurred. There may be specific variations in the values of the historical operational parameters that led to the "memory fault" in the primary controller. The one or more models (204) may require time series data to identify the patterns. In some embodiments, the signatures may also be identified. Not always patterns may lead to the failure in the primary controller (102a). A specific variation in the historical operational parameters may also have led to the one or more historical events. Such specific variation can be considered as signatures, which may not need time series data, but data at a specific time (for example one value of an operational parameter). In one embodiment, the domain expert may have labelled few historical operational parameters while the one or more models (204) may use the labels to further label the historical operational parameters which may comprise huge data set. An auto-labeler may be used to label the historical operational parameters. The Auto-labeler may be an AI based model. In an embodiment, the one or more models (204) may also determine time taken for the primary controller (102a) failed from the identified patterns or signatures. In some embodiment, the one or more models (204) may map the time value against each of the one or more events.

At step (304) the one or more models (204) classifies the identified patterns or signatures into normal patterns or signatures and abnormal patterns or signatures. In one embodiment, the domain expert may also label few historical operational parameters with normal patterns and abnormal patterns. The one or more models (204) may be trained to label the historical operational parameters with the normal patterns and the abnormal patterns using the labels provided by the domain expert. In an embodiment, the abnormal patterns may be an entire region after a certain point in the time series data. In an embodiment, the abnormal signature may be a point value in the historical operational parameters. It is apparent to a person skilled in the art that point values or time series data can be used to observe the abnormal signatures in the primary controller (102a). Therefore, it will also be apparent to the person skilled in the art how the AI models are trained and used for inferring the abnormal behavior of the primary controller (102a). In an embodiment, the classification models may be used for classifying into normal patterns and abnormal patterns. In an embodiment, the normal patterns or abnormal patterns may be stored as reference patterns. For example, in process/industrial plants where the one or more historical events are certain and are known to the domain experts, the abnormal patterns may be stored as reference patterns. In process/industrial plants where the one or more historical events are uncertain and are generally not known to the domain experts, the normal patterns may be stored as reference patterns. The reference patterns are compared with real-time operational parameters of the primary controller (102a) to predict the one or more events. In an embodiment, the training of the one or more models (204) is concluded when the one or more models (204) have a defined efficiency.

Figure 3B:
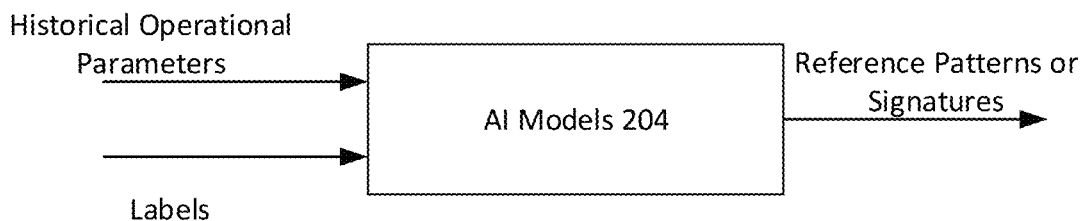
FIG. 3b illustrates an exemplary diagram of generating reference patterns or signatures, in accordance with some embodiments of the present invention

FIG. 3b shows an example diagram of generating the reference patterns or signatures. As shown, the one or more models (204) receive the historical operational parameters as inputs. Optionally, the one or more models (204) may also receive labels as inputs. In an embodiment, the one or more models (204) may cluster the different types of events and label the clusters without the domain expert providing the labels as input. Further, the one or more models (204) generate the reference patterns or signatures using the historical operational parameters as described in FIG. 3a. The reference patterns or signatures are then saved in the memory (202).

Figure 4A:
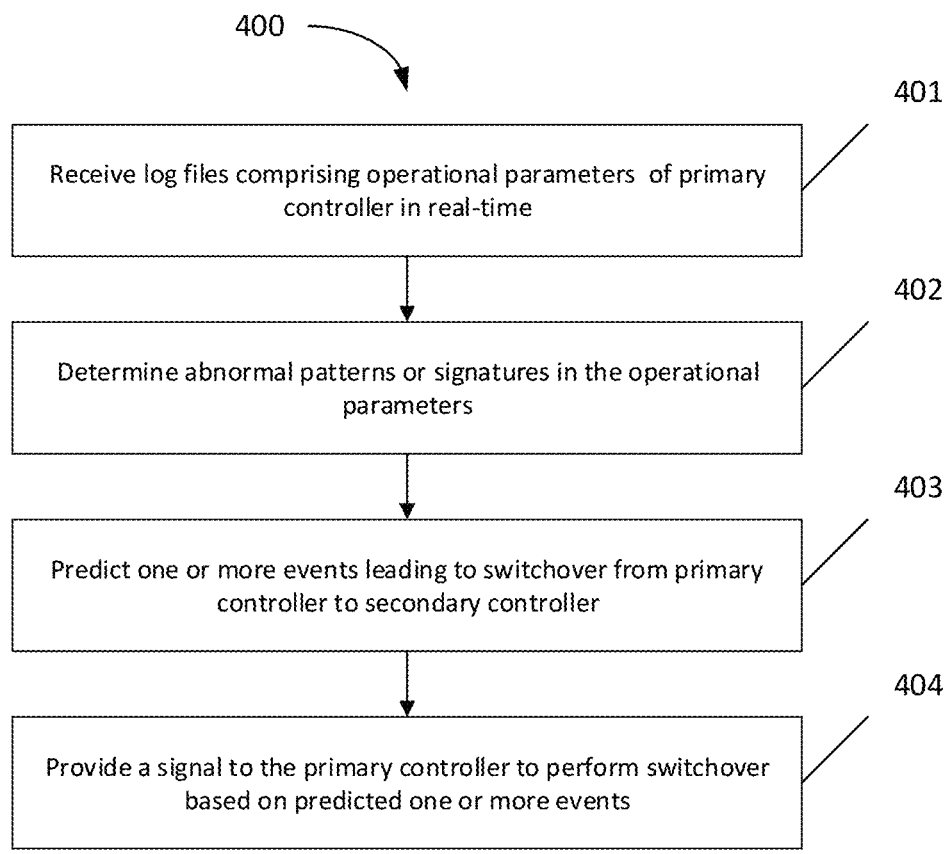
FIG. 4a illustrates an exemplary flowchart for performing redundancy switchover in a process/industrial plant, in accordance with some embodiments of the present invention.

FIG. 4a illustrates an exemplary flowchart for performing redundancy switchover in a process/industrial plant. The following steps are performed in real-time.

At step (401) the server (101) receives log files comprising the operational parameters of the primary controller (102a) in real-time. In an embodiment, the operational parameters may be received at regular time intervals (for example every 5 minutes). In an embodiment, the operational parameters are received during normal operation of the primary controller (102a). When the primary controller (102a) is operating normally, the secondary controller (102b) is in hot stand-by. The operational parameters includes hardware parameters, software parameters, firmware parameters and network parameters.

At step (402) the server (101) determines abnormal patterns or signatures in the operational parameters by comparing the operational parameters with the reference patterns or signatures. In an embodiment, the server (101) may compare the operational parameters with reference abnormal patterns or signatures or with reference normal patterns or signatures. When comparing the operational parameters with normal patterns or signatures, the abnormal patterns or signatures in the operational parameters is determined when the values of the operational parameters deviate from the normal patterns or signatures. When comparing the operational parameters with abnormal patterns or signatures, the abnormal patterns or signatures in the operational parameters is determined when the values of the operational parameters match the abnormal patterns or signatures.

Figure 5:
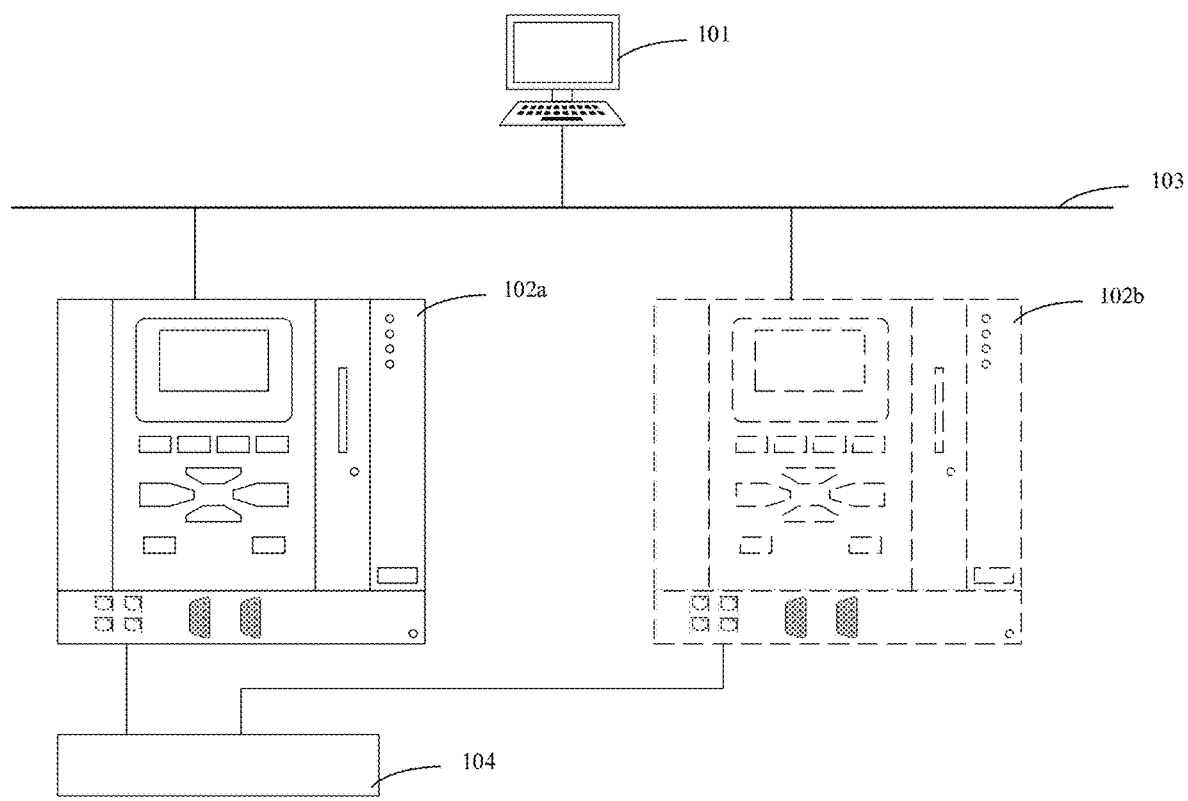
FIG. 5 illustrates an exemplary scenario of normal operation of a primary controller in a process/industrial plant, in accordance with some embodiments of the present invention.

At step (403) the server (101) predicts the one or more events leading to switchover from the primary controller (102a) to the secondary controller (102b). The one or more events are the events that lead to failure of the primary controller (102a). In an embodiment, the one or more trained models are used to predict the one or more events. The one or more trained models may have associated the events with the reference patterns or the signatures. Using the association, the one or more models (204) predicts the one or more events in real time. For example, the one or more models (204) may identify abnormal patterns in operational parameters related to memory of the primary controller (102a) and predict that a memory fault may occur. In an embodiment, the one or more models (204) may also predict time to failure of the primary controller (012a). For example, the one or more models (204) may predict that the primary controller (102a) may fail after 5 minutes from detecting the abnormal patterns in the operational parameters related to the memory. FIG. 5 illustrates an exemplary scenario where the primary controller (102a) is operating normally and the secondary controller (102b) is in hot stand-by, while the server (101) receives the operational parameters of the primary controller (102a).

At step (404) the server (101) provides a signal to the primary controller (102a) to perform switchover to the secondary controller (102b). In an embodiment, the server (101) provides the signal to the primary controller (102a) even before the primary controller (102a) fails. Hence, the switchover from the primary controller (102a) to the secondary controller (102b) occurs before the primary controller (102a) fails. Thus, the problems associated with switchover after the primary controller (102a) fails is avoided. When the primary controller (102a) receives the signal from the server (101) the primary controller (102a) transfers its operational parameters along with the status associated with the equipment (104). Further, the secondary controller (102b) controls the equipment (104) and the primary controller (102a) is inactive and may be scheduled for maintenance. In an embodiment, when the one or more models (204) predict the one or more events, a notification may be provided to indicate the one or more events. An operator may attend the notification and resolve the one or more events before the switchover so that the one or more events do not occur in the secondary controller (102b). In an embodiment, the operational parameters of the secondary controller (102b) may be modified to avoid the one or more events from occurring in the secondary controller (102b). For example, in case of "memory fault" the operator may provide the secondary controller (102b) with additional memory. Hence, the predicted event of "memory fault" does not occur in the secondary controller (102b).

Figure 4B:
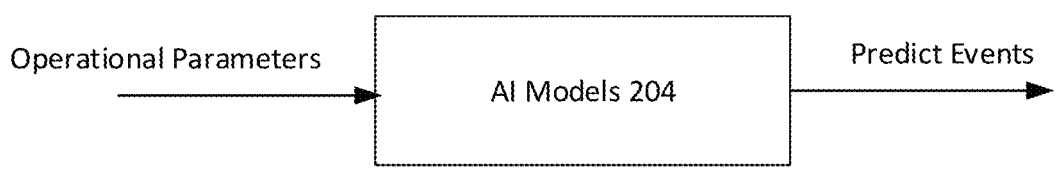
FIG. 4b illustrates an exemplary diagram of predicting events in the primary controller, in accordance with some embodiments of the present invention.

As shown in FIG. 4b the one or more models (204) are provided with the real-time operational parameters of the primary controller (102a). Since the one or more models (204) are trained and have generated the reference patterns or signatures, the one or more models (204) compare the operational parameters to the reference patterns or signatures. Based on the comparison, the one or more models (204) predict the one or more events (failure events) in the primary controller (102a), and the signal is provided to the primary controller (102a) to perform the preventive switchover to the secondary controller (102b) even before the primary controller (102a) fails.

Figure 6:
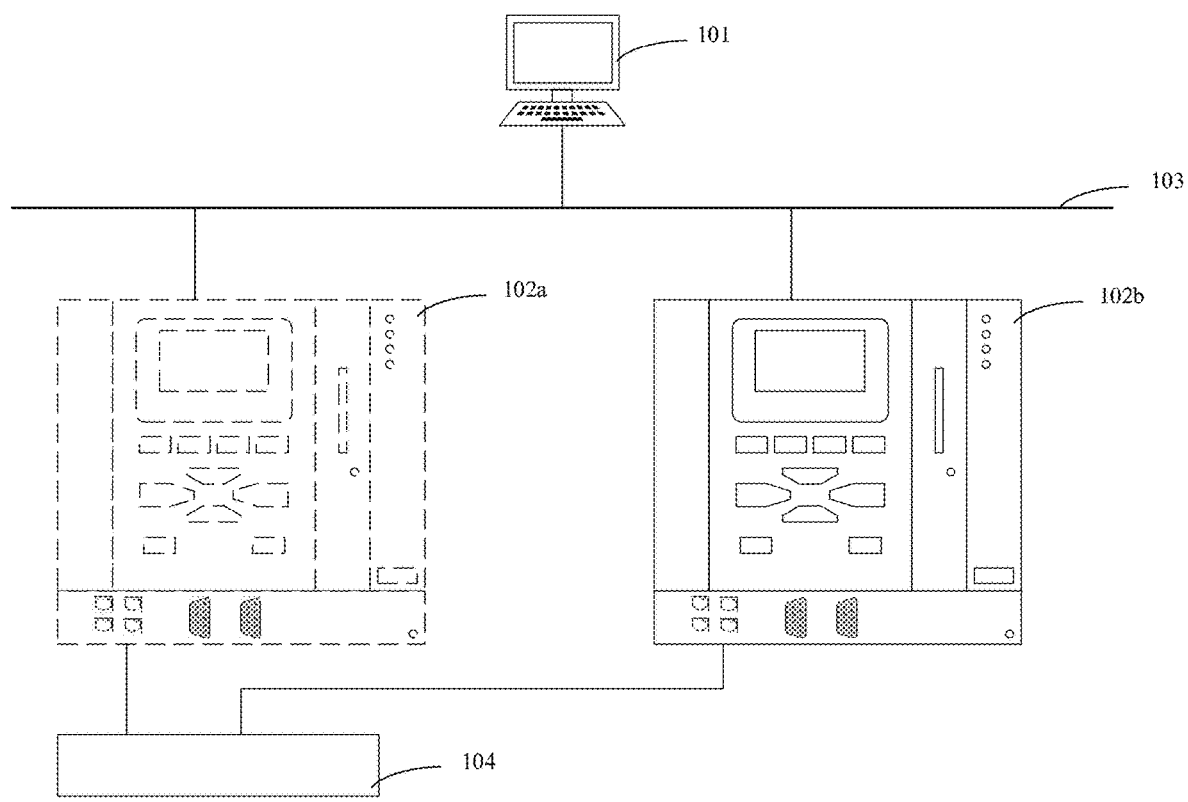
FIG. 6 illustrates an exemplary scenario of abnormal operation of a primary controller in a process/industrial plant, in accordance with some embodiments of the present invention.

Therefore, the signal provided by the server (101) enable preventive switchover from the primary controller (102a) to the secondary controller (102b). In an embodiment, as the fault in the primary controller (102a) does not occur, logs comprising failure events are reduced and such logs can be closed. FIG. 6 illustrates a scenario where the secondary controller (102b) controls the equipment (104) and the primary controller (102a) is inactive.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

I claim:

1. A method of performing a redundancy switchover in an industrial plant, wherein the industrial plant comprises a primary controller and a secondary controller, wherein the secondary controller is redundant to the primary controller, wherein the primary controller is configured to operate one or more equipment, wherein the primary controller and the secondary controller are connected to a server, wherein the method comprises:
   receiving, by the server, log files from the primary controller in real-time, wherein the log files comprise a plurality of operational parameters of the primary controller;
   determining, by the server, abnormal patterns or signatures in the plurality of operational parameters of the primary controller by comparing the plurality of operational parameters with reference patterns or signatures, wherein the reference patterns or signatures are generated based on one or more trained models;
   predicting, by the server, one or more events leading to a switchover from the primary controller to the secondary controller based on the abnormal patterns or signatures in the plurality of operational parameters of the primary controller; and
   providing, by the server, a signal to the primary controller to perform the switchover based on the predicted one or more events, thereby performing preventive controller switchover from the primary controller to the secondary controller, wherein the method further comprises generating the reference patterns or signatures, wherein generating the reference patterns or signatures comprises:
      receiving, by the server, training log files comprising historical operational parameters of the primary controller;
      detecting, by the server, one or more historical events which led to a historical switchover from the primary controller to the secondary controller;
      identifying, by the server, patterns or signatures in the historical operational parameters in the training log files corresponding to the one or more historical events which led to the historical switchover; and
      classifying, by the server, normal patterns or signatures and abnormal patterns or signatures based on the identified patterns or signatures, wherein the reference patterns or signatures are one of, the normal patterns or signatures or the abnormal patterns or signatures.

2. The method of claim 1, wherein the plurality of operational parameters comprises at least one of: hardware parameters, software parameters, firmware parameters, and network parameters.

3. The method of claim 1, wherein the one or more trained models are Artificial Intelligence based models.

4. The method of claim 1, wherein the abnormal patterns or signatures are determined and the one or more events are predicted by the one or more trained models.

5. The method of claim 1, wherein based on the predicted one or more events, operational parameters of the secondary controller are modified before performing the switchover from the primary controller to the secondary controller.

6. A server for performing redundancy switchover in an industrial plant, wherein the industrial plant comprises a primary controller and a secondary controller, wherein the secondary controller is redundant to the primary controller, wherein the primary controller is configured to operate one or more equipment, wherein the primary controller and the secondary controller are connected to the server, wherein the server comprises:
   a memory; and
   one or more processors configured to:
      receive log files from the primary controller in real-time, wherein the log files comprise a plurality of operational parameters of the primary controller;
      determine abnormal patterns or signatures in the plurality of operational parameters of the primary controller by comparing the plurality of operational parameters with reference patterns or signatures, wherein the reference patterns or signatures are generated based on one or more trained models;
      predict one or more events leading to a switchover from the primary controller to the secondary controller based on the abnormal patterns or signatures in the plurality of operational parameters of the primary controller;
      based on the predicted one or more events, modify operational parameters of the secondary controller; and
      subsequent to modifying the operational parameters of the secondary controller, provide a signal to the primary controller to perform the switchover based on the predicted one or more events, thereby performing preventive controller switchover from the primary controller to the secondary controller.

7. The server of claim 6, wherein the one or more trained models are Artificial Intelligence based models.

8. The server of claim 6, wherein, for generating the reference patterns or signatures, the one or more processors are configured to:
   receive training log files comprising historical operational parameters of the primary controller;
   detect one or more historical events which led to switchover from the primary controller to the secondary controller;
   identify patterns or signatures in the historical operational parameters in the training log files corresponding to the one or more historical events which led to the switchover; and
   classify normal patterns or signatures and abnormal patterns or signatures based on the identified patterns or signatures, wherein the reference patterns or signatures are one of, the normal patterns or signatures or the abnormal patterns or signatures.

9. The sever of claim 6, wherein the one or more processors are associated with a display unit to display a notification about the predicted one or more events.

10. A system for performing redundancy switchover in an industrial plant, the system comprising:
a primary controller configured to operate one or more equipment in the industrial plant;
a secondary controller redundant to the primary controller; and
a server configured to:
receive log files from the primary controller in real-time, wherein the log files comprise a plurality of operational parameters of the primary controller;
determine abnormal patterns or signatures in the plurality of operational parameters of the primary controller by comparing the plurality of operational parameters with reference patterns or signatures, wherein the reference patterns or signatures are generated based on one or more trained models;
predict one or more events leading to a switchover from the primary controller to the secondary controller based on the abnormal patterns or signatures in the plurality of operational parameters; and
provide a signal to the primary controller to perform the switchover based on the predicted one or more events, thereby performing preventive controller switchover from the primary controller to the secondary controller, wherein based on the predicted one or more events, operational parameters of the secondary controller are modified before performing the switchover from the primary controller to the secondary controller.

11. The system of claim 10, wherein the one or more trained models are Artificial Intelligence based models.

12. The system of claim 10, wherein, for generating the reference patterns or signatures, the server is configured to:
receive training log files comprising historical operational parameters of the primary controller;
detect one or more historical events which led to switchover from the primary controller to the secondary controller;
identify patterns or signatures in the historical operational parameters in the training log files corresponding to the one or more historical events which led to the switchover; and
classify normal patterns or signatures and abnormal patterns or signatures based on the identified patterns or signatures, wherein the reference patterns or signatures are one of, the normal patterns or signatures or the abnormal patterns or signatures.

13. The system of claim 10, further comprises a display unit to display a notification about the predicted one or more events.

* * * * *